United States Patent
Ramasamy et al.

(10) Patent No.: US 6,737,037 B2
(45) Date of Patent: May 18, 2004

(54) SOLID STATE THERMAL SYNTHESIS OF LITHIUM COBALTATE

(75) Inventors: Chandrasekaran Ramasamy, Tamil Nadu (IN); Mani Ariyanan, Tamil Nadu (IN); Vasudevan Thiagarajan, Tamil Nadu (IN); Gangadharan Ramaiyer, Tamil Nadu (IN)

(73) Assignee: Council of Scientific and Industrial Research, New Delhi (IN)

( * ) Notice: Subject to any disclaimer, the term of this patent is extended or adjusted under 35 U.S.C. 154(b) by 25 days.

(21) Appl. No.: 10/113,211

(22) Filed: Mar. 28, 2002

(65) Prior Publication Data

US 2003/0185744 A1 Oct. 2, 2003

(51) Int. Cl.$^7$ .............................. C01D 1/20; H01M 4/52
(52) U.S. Cl. ................................... 423/594.6; 429/231.3
(58) Field of Search .................... 423/594.6; 429/231.3

(56) References Cited

U.S. PATENT DOCUMENTS 5,567,401 A * 10/1996 Doddapaneni et al. ... 423/179.5
5,591,548 A * 1/1997 Mao ........................... 429/223
5,914,094 A 6/1999 Sun et al. .................. 423/594

FOREIGN PATENT DOCUMENTS

CN       1327951 A   * 12/2001   .......... C01G/51/00
EP       0 824 087 A1   2/1998   .......... C01G/51/00
JP       2001357846   12/2001

OTHER PUBLICATIONS

Kiyoshi Kanamura et al., *Electrochem. and Solid State Ltrs*, 2000, 3(6):256–258.
PCT Search Report.
S. Choi et al., *J. Electrochem. So.*, 2002, 149(2), 162–166.
Won Sub Yoon et al, *J. Electrochem So.*, 2002, 149(2) 146–151.
Mun–Kyu Kim et al, *J of Power Sources.*, 2001, vol. 99, 34–40.
Jierong Ying et al, *J of Power Sources*, 2001, vol. 99, 78–84.
Won–Sub Yoon et al., *J. of Power Sources*, 2001, vol. 97–98, 282–286.
Dong Zhang et al, *J. of power sources*, 1999, vol. 83, 121–127.
W. Liu et al, *J of Electrochem Soc.*, 1996, 143:3, 879–884.

* cited by examiner

*Primary Examiner*—Stanley S. Silverman
*Assistant Examiner*—Jonas N. Strickland
(74) *Attorney, Agent, or Firm*—Morgan & Finnegan, LLP

(57) ABSTRACT

The present invention provides a process for the preparation of lithium cobaltate by a solid state thermal one step process comprising mixing lithium oxide ($Li_2O$) and cobalt nitrate ($Co(NO_3)_2$) in solid state uniformly, adding a heat generating material to the mixture and grinding the mixture and heating the ground mixture at a temperature in the range of 650 to 700° C. to obtain the desired lithium cobaltate.

8 Claims, 1 Drawing Sheet

XRD Patterns of $LiCoO_2$ from $Li_2O + Co(NO_3)_2$ at 700°C. (a) with Urea. (b) Ammonium Nitrate.

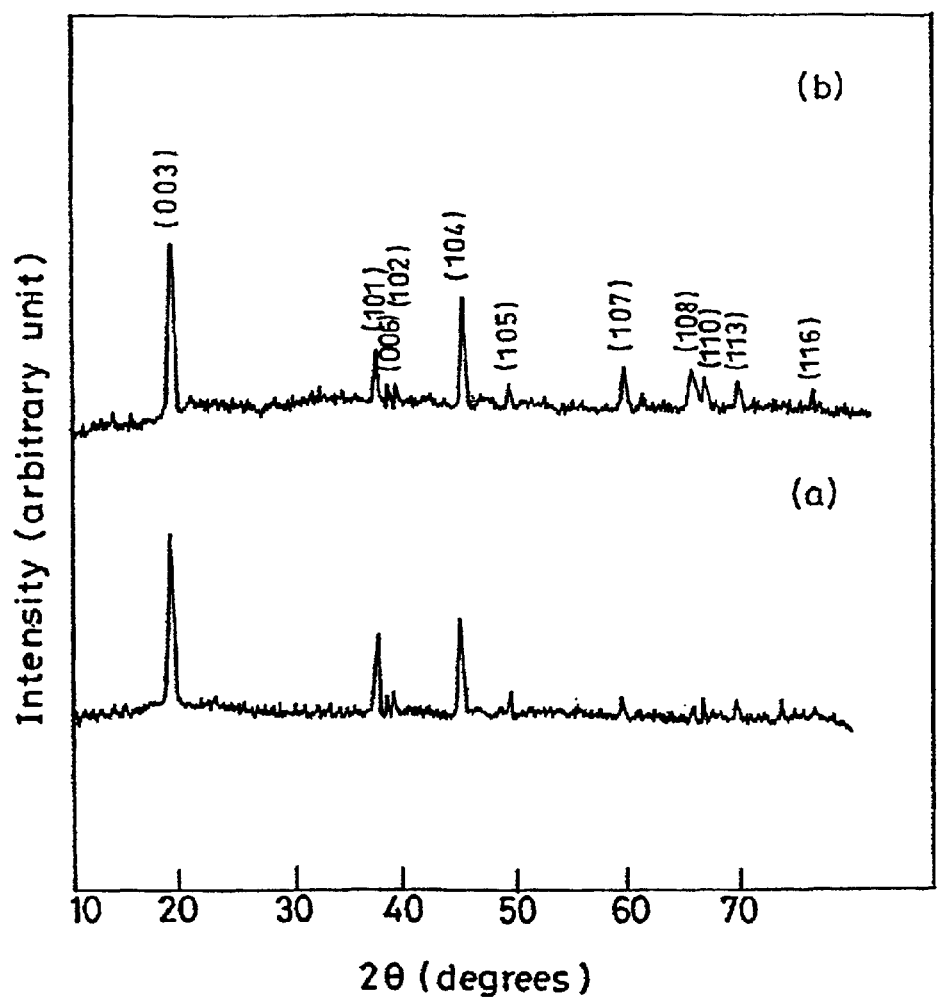
Fig.1 : XRD Patterns of $LiCoO_2$ from $Li_2O + Co(NO_3)_2$ at 700°C. (a) with Urea. (b) Ammonium Nitrate.

SOLID STATE THERMAL SYNTHESIS OF LITHIUM COBALTATE

FIELD OF THE INVENTION

The present invention relates to a novel solid state thermal process for the preparation of lithium cobaltate ($LiCoO_2$) useful as a cathode material in nonaqueous, solid state and polymer electrolyte for secondary rock in chair or intercalated batteries.

BACKGROUND OF THE INVENTION

Lithium cobaltate ($LiCoO_2$) is widely used as a cathode in lithium secondary cells in the view of its high reversibility to lithium ions and less fading capacity over $LiNiO_2$ and $LiMn_2O_4$ electrodes.

Methods reported in the art for the preparation of cathode lithium cobaltate ($LiCoO_2$) disclose the reaction of lithium nitrate, or lithium hydroxide, lithium acetate or any other lithium salts with cobalt nitrates, oxides, acetates, hydroxides, sulphates by soft chemistry method like sol-gel process between temperature ranges of 350–500° C. for long duration of time and multistep preparation procedures. Normally, in solid state thermal methods in the synthesis of these oxide materials, the duration of preparation is long heating, intermittent cooling and grinding process. Other preparation methods are also available in literature for synthesizing lithium cobaltate like pulsed laser deposition, sputtering and electrostatic spray deposition.

REFERENCES

1. "Synthesis and electrochemical properties of $LiCoO_2$ spinel cathodes"—S. Chol and A. Manthiram, *Journal of the Electrochemical Society*, Vol. 149(2) (2002) A162–166.
2. "X-ray absorption spectroscopic study of $LiAl_yCO_{1-y}O_2$ cathode for lithium rechargeable batteries"—Won-Sub Yoon, Kyung-Keun Lee and Kwang-Bum Kim, *Journal of the Electrochemical society*, Vol. 149(?) (2002) A146–151.
3. "High temperature combustion synthesis and electrochemical characterization of $LiNiO_2$, $LiCoO_2$ and $LiMn_2O_4$ for lithium ion secondary batteries"—M. M. Rao, C. Liebenow, M. Jayalakshmi, M. Wulff, U. Guth and F. Scholz, *J. of Solid State Electrochemistry*, Vol. 5, Issue 5 (2001) 348–354.
4. "Fabrication of $LiCoO_2$ thin films by sol gel method and characterization as positive electrodes for Li/$LiCoO_2$ cells"—M. N. Kim, H. Chung, Y. Park, J. Kim, J. Son, K. Park and H. Kim, *Journal of Power Sources*, Vol. 99(2001) 34–40.
5. "Preparation and characterization of high-density sperical $LiNi_{0.8}CoO_2$ cathode material for lithium secondary batteries"—Jierong Ying, Chunrong Wan, Changyin Jiang and Yangxing Li, *J. of Power Sources*, Vol. 99 (2001) 78–84.
6. "Electrochemical characterization of layered $LiCoO_2$ films prepared by electrostatic deposition", Won-Sub Yoon, Sung-Ho Ban, Kyung-Keun Lee, Kwang-Bum Kim, Min Dyu Kim and Jay Min Lee, *J. of Power Sources*, Vol. 97–98 (2001) 282–286.
7. "Emulsion-derived lithium manganese oxide powder for positive electrodes in lithium ion batteries" Chung-Hsin Lu & Shang-Wei Lin. *J. of Power Sources*, Vol. 93(2001) 14–19.
8. "Cobalt doped chromium oxides as cathode materials for secondary batteries for lithium secondary batteries" Dong Zhang, Branko N. Popov, Yury M. Poddrahansky, Pankaj Arora and Ralph E. White, *J. of Power Sources*, Vol. 83 (1999) 121–127.
9. "Synthesis and electrochemical studies of spinel phase $LiMn_2O_4$ cathode materials prepared by the pechini process" W. Liu, G. C. Farrington, F. Chaput and B. Dunn, *Journal of the Electrochemical society*, Vol. 143, No.3 (1996) 879–884.

The above reported conventional processes show several disadvantages. Generally any one or all of the following are seen:

1. Side reactions occur, i.e., formation of unexpected and unwanted byproducts.
2. Unreacted material is left behind which acts as impurity.
3. Partial reactions occur.
4. Several steps and long calcination time are needed for preparation.
5. Controlled conditions required.
6. Undesirable phases formed.

It is therefore important to develop processes which overcome the disadvantages enumerated above.

OBJECTS OF THE INVENTION

The main object of this present invention is to provide a novel method for the preparation of Lithium cobaltate ($LiCoO_2$) hitherto unattempted which obviates the drawbacks mentioned above.

It is another object of the invention to avoid multi-step processes, formation of undesirable and unexpected byproducts and undesirable phases reported in prior art.

SUMMARY OF THE INVENTION

These and other objects of the invention are achieved by the novel process of the invention comprising solid state thermal one step reaction of lithium oxide and cobalt nitrate Accordingly, the present invention relates to a process for the preparation of lithium cobaltate by a solid state thermal one step process comprising mixing lithium oxide ($Li_2O$) and cobalt nitrate ($Co(NO_3)_2$) in solid state uniformly, adding a heat generating material to the mixture and grinding the mixture, heating the ground mixture at a temperature in the range of 650 to 700° C. to obtain the desired lithium cobaltate.

In one embodiment of the invention, the ratio of the $Li_2O+Co(NO_3)_2$ mixture and the heat generating material is 1:3.

In another embodiment of the invention the ground mixture is heated in a furnace for about 8 hours.

In one embodiment of the invention, the $Li_2O$ is mixed with $Co(NO_3)_2$ in the following ratios.

$Li_2O:Ni(NO_3)_2$ 1:2

In another embodiment of the invention, the heat generating material is selected from urea and ammonium nitrate.

In yet another embodiment of the invention electric furnace is used for heating.

In still another embodiment of the invention, the materials used are all in solid state.

BRIEF DESCRIPTION OF THE ACCOMPANYING DRAWINGS

FIG. 1 is an X-ray diffraction pattern of lithium cobaltate obtained by the process of the invention.

DETAILED DESCRIPTION OF THE INVENTION

The present invention involves a solid state thermal one step process process for the preparation of lithium cobaltate comprising mixing lithium oxide ($Li_2O$) and cobalt nitrate ($Co(NO_3)_2$) in solid state uniformly, adding a heat generating material such as urea or ammonium nitrate to the mixture and grinding the mixture, heating the ground mixture at a temperature in the range of 650 to 700° C. to obtain the desired lithium cobaltate. The ratio of the $Li_2O+Co(NO_3)_2$ mixture and urea is preferably 1:3. The ground mixture is heated in a furnace for about 8 hours. The $Li_2O$ is mixed with $Co(NO_3)_2$ in the following preferred ratio:

$Li_2O:Ni(NO_3)_2=1:2$

Heating is carried out preferably in an electric furnace with all materials used being in the solid state.

The following reaction occurs during the thermal process.

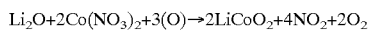

$Li_2O+2Co(NO_3)_2+3(O) \rightarrow 2LiCoO_2+4NO_2+2O_2$

The reaction as can be seen proceeds in a single step and the product was confirmed as lithium cobaltate by X-ray diffraction.

$Li_2O$ solid state material is allowed to react with solid $Co(NO_3)_2$ under controlled conditions at moderate temperatures which yields fairly very good sample of spinel structure useful as a very good intercalating cathode. Pure AR sample of $Co(NO_3)_2$ is mixed with pure AR sample of $Li_2O$ in the molecular ratio of 2:1 such that a uniform mixture is formed with 3 times weight percentage of urea. In order to obtain a better homogeneous mixture, this mixture is ground well with double distilled water free DiEthylene Carbonate (DEC). This mixture is heated to 300° C. and then further heated to 700° C. for 5 hours continuously to yield lithium cobaltate ($LiCoO_2$) which is evidenced by X-ray analysis (FIG. 1a).

The reaction can also be carried out by replacing urea with ammonium nitrate. $Li_2O$ solid state material is allowed to react with solid $Co(NO_3)_2$ under controlled conditions at moderate temperatures which yields fairly very good sample of spinel structure useful as a very good intercalating cathode. Pure AR sample of $Co(NO_3)_2$ is mixed with pure AR sample of $Li_2O$ in the molecular ratio of 2:1 such that a uniform mixture is formed with 3 times weight percentage of ammonium nitrate. In order to obtain a better homogeneous mixture, this mixture is ground well with double distilled water free Di ethylene carbonate (DEC). This mixture was heated to 300° C. and then heated to 700° C. for 5 hours continuously to yield lithium cobaltate ($LiCoO_2$) as is evidenced by X-ray analysis (FIG. 1b).

The following examples are given by way of illustration and therefore should not be construed to limit the scope of the present invention.

EXAMPLE 1

Preparation of $LiCoO_2$:

$Li_2O$ solid state material is allowed to react with solid $Co(NO_3)_2$ under controlled conditions at moderate temperatures which yields fairly very good sample of spinel structure useful as a very good intercalating cathode. Pure AR sample of $Co(NO_3)_2$ is mixed with pure AR sample of $Li_2O$ in the molecular ratio of 2:1 such that a uniform mixture is formed with 3 times weight percentage of urea. In order to obtain a better homogeneous mixture, this mixture is ground well with double distilled water free Di Ethylene Carbonate (DEC). This mixture is heated to 300° C. for 3 hours and then heated to 700° C. for 5 hours continuously to yield lithium cobaltate ($LiCoO_2$) which is evidenced by X-ray analysis (FIG. 1a).

EXAMPLE 2

Preparation of $LiCoO_2$:

$Li_2O$ solid state material is allowed to react with solid $Co(NO_3)_2$ under controlled conditions at moderate temperatures which yields fairly very good sample of spinel structure useful as a very good intercalating cathode. Pure AR sample of $Co(NO_3)_2$ is mixed with pure AR sample of $Li_2O$ in the molecular ratio of 2:1 such that a uniform mixture is formed with 3 times weight percentage of ammonium nitrate. In order to obtain a better homogeneous mixture, this mixture is ground well with double distilled water free Di ethylene carbonate (DEC). This mixture was heated to 300° C. and then heated to 7001° C. for 5 hours continuously yields lithium cobaltate ($Li_2O$) formed which is evidenced by X-ray analysis (FIG. 1b).

EXAMPLE 3

AR pure dry Li2O is mixed with pure dry AR $Co(NO_3)_2$ in the molar ratio of 1:2 in a pestle and mortar arrangement and then the mix is further mixed with 3 times the weight of urea and then introduced in an electric furnace. This mixture was heated first for 3 hours at 300° C. and then heated at 700° C. for 5 hours. (AR means analytical reagent grade.)

| Components | Compositions |
| --- | --- |
| AR $Li_2O$ | 0.333 g |
| AR $Co(NO_{31})_2$ | 0.667 g |
| Urea | 3.00 g |
| Pre heating temperature | 300° C. |
| Final temperature | 500° C. |
| Time | 8 hours |
| Particle size of the product | 10–20 μm |
| Nature of the product | Black |
| Efficiency of the process | >80% |

EXAMPLE 4

Pure dry AR $Li_2O$ is mixed with pure dry AR $Co(NO_3)_2$ in the molar ratio of 1:2 in a pestle and mortar arrangement and then the mix is further mixed with 3 times the weight of ammonium nitrate. The final mixture was heated first for 3 hours at 300° C. and then heated at 700° C. for 5 hours.

| Components | Compositions |
| --- | --- |
| $Li_2O$ | 0.333 g |
| $Co(NO_3)_2$ | 0.667 g |
| Ammonium nitrate | 3.00 g |
| Pre heating temperature | 300° C. |
| Final temperature | 700° C. |
| Time | 8 hours |
| Particle size of the product | 10–20 μm |
| Nature of the product | Black |
| Efficiency of the process | >80% |

CONCLUSION

1. Lithium oxide reacts with $Co(NO_3)_2$ in equimolar proportion of 1:2 to form $LiCoO_2$.
2. Urea, ammonium nitrate and similar heat generating materials can be used as a self-heat generating materials without much change in efficiency or product compositions and these materials are significant in the formation of spinel structure 3. The temperature of formation is in the range of 650° C. to 700° C.
4. The heating time is only around 8 hours.

The main advantages of the present invention are

1. It is a single step solid state thermal process
2. $Li_2O$ can be used to react with $Co(NO_3)_2$ to form $LiCoO_2$ of high capacity cathode for intercalation.
3. Heating time is only around 8 hours, and hence considerable heating time can be saved.

We claim:

1. A process for the preparation of lithium cobaltate by a solid state thermal one step process comprising mixing lithium oxide ($Li_2O$) and cobalt nitrate ($Co(NO_3)_2$) in solid state uniformly, adding a heat generating material to the mixture and grinding the mixture, heating the ground mixture at a temperature in the range of 650 to 700° C. to obtain the desired lithium cobaltate.

2. A process as claimed in claim 1 wherein the ratio of the $Li_2O+Co(NO_3)_2$ mixture and the heat generating material is 1:3.

3. A process as claimed in claim 1 wherein the ground mixture is heated in a furnace for about 8 hours.

4. A process as claimed in claim 1 wherein the $Li_2O$ is mixed with $Co(NO_3)_2$ in a ratio of 1:2.

5. A process as claimed in claim 1 wherein the heat generating material is selected from urea and ammonium nitrate.

6. A process as claimed in claim 1 wherein an electric furnace is used for heating.

7. A process as claimed in claim 1 wherein the materials used are all in solid state.

8. A process as claimed in claim 1 wherein no side reactions occur.

* * * * *